United States Patent [19]

Miyakawa

[11] Patent Number: 5,559,421
[45] Date of Patent: Sep. 24, 1996

[54] APPARATUS FOR REMOVING HARMONIC COMPONENTS OF AN ELECTRIC POWER FREQUENCY GENERATED IN ELECTRIC POWER GENERATION EQUIPMENT

[75] Inventor: Kado Miyakawa, Hitachi, Japan

[73] Assignee: Hitachi, Ltd., Tokyo, Japan

[21] Appl. No.: 205,808

[22] Filed: Mar. 4, 1994

[30] Foreign Application Priority Data

Mar. 9, 1993 [JP] Japan ................... 5-048087

[51] Int. Cl.⁶ ..................................... H02K 11/00
[52] U.S. Cl. ..................... 322/58; 322/10; 307/105
[58] Field of Search ........................ 322/7, 10, 13; 363/39, 34; 290/46

[56] References Cited

U.S. PATENT DOCUMENTS

| | | | |
|---|---|---|---|
| 3,591,844 | 7/1971 | Sehomebeck | 290/31 |
| 4,053,820 | 10/1977 | Peterson et al. | 363/44 |
| 4,786,852 | 11/1988 | Cook | 322/10 |
| 4,812,669 | 3/1989 | Takeda et al. | 307/105 |
| 4,992,721 | 2/1991 | Latos | 322/10 |
| 5,012,400 | 4/1991 | Yasuda | 363/95 |
| 5,015,941 | 5/1991 | Dhyanchand | 322/10 |
| 5,038,095 | 8/1991 | Kirchberg et al. | 322/58 |
| 5,225,712 | 7/1993 | Erdman | 290/44 |
| 5,309,353 | 5/1994 | Schauder et al. | 364/148 |
| 5,321,598 | 6/1994 | Moran | 363/41 |
| 5,406,189 | 4/1995 | Wohlberg et al. | 322/10 |

Primary Examiner—Thomas M. Dougherty
Assistant Examiner—Nicholas Ponomarenko
Attorney, Agent, or Firm—Antonelli, Terry, Stout & Kraus

[57] ABSTRACT

In a generator starting apparatus, in which commercial frequency electric power supplied from an electric power system is converted into variable-voltage variable-frequency electric power to thereby start a gas turbine generator, a harmonic-component removing apparatus is provided which removes harmonic components contained in the converted variable-voltage variable-frequency electric power on the basis of the detected harmonic components. In addition, an apparatus for removing harmonic components generated in an electric power equipment is provided, wherein harmonic components contained in an electric power system are detected so that they may be removed.

7 Claims, 5 Drawing Sheets

APPARATUS FOR REMOVING HARMONIC COMPONENTS OF AN ELECTRIC POWER FREQUENCY GENERATED IN ELECTRIC POWER GENERATION EQUIPMENT

BACKGROUND OF THE INVENTION

The present invention relates to an apparatus for removing harmonic components of electric power generated in electric power generation equipment at the time of starting of or in rated operating conditions of a turbine-driven generator.

Gas turbine electric power generation equipment using a gas turbine, and combined cycle electric power generation equipment using a gas turbine and a steam turbine in combination, as a prime mover are conventionally known. As is well known, a gas turbine of an ordinary type is provided with a compressor directly connected to the gas turbine so that a mixture of air compressed by the compressor and fuel such as natural gas is combusted to obtain a combustion gas, and the combustion gas is supplied to the turbine to make the turbine rotate to thereby generate motive power, while the compressor is driven to rotate by the gas turbine to thereby carry out its operation continuously. Accordingly, in any case the compressor must be driven to rotate to obtain compressed air at the time of starting of the turbine.

In the case of gas turbine electric power generation equipment or the like, it is therefore necessary that torque be supplied from the outside to the gas turbine to maintain the rotating of the gas turbine when torque generated by the gas turbine is lower than the sum of torque (internal torque) required for driving the compressor and the torque (load torque) required for driving the generator.

As a result, in the case of gas turbine electric power generation equipment or in the case of combined cycle electric power generation equipment, a starter for driving the gas turbine to rotate is required until the torque generated by the gas turbine becomes higher than the sum of the internal torque and the load torque so that the gas turbine becomes able to increase its rotational speed on its own.

As a starter which is adapted to this case, conventionally, such an apparatus using an induction motor as shown in FIG. 6 has been used.

In the electric power generation equipment shown in FIG. 6, a generator 5 is driven to rotate by a gas turbine 6 to thereby generate electric power, the voltage of the generated electric power is converted into a predetermined value by a transformer 8, and the electric power with the predetermined voltage is supplied to an electric power system through a circuit-breaker 7.

In the electric power generation equipment, a rotation shaft extending from on side of the gas turbine 6 and a rotation shaft of the generator 5 are directly connected concentrically and coaxially with each other, while a rotation shaft extending from the other side of the gas turbine 6 is connected to an induction motor 20 through a torque converter 19. At the time of starting of the gas turbine 6, the driving power generated by the induction motor 20, rotated by electric power supplied from the electric power system, is converted into predetermined torque by the torque converter 19 so that the predetermined torque is transmitted to the gas turbine 6 to thereby start the gas turbine 6.

In recent years, large-capacity gas turbine electric power generation equipment or combined cycle electric power generation equipment using a gas turbine has been built to satisfy an increased demand for electric power. With the increase of the capacity of electric power generation equipment, it becomes necessary that a large-capacity motor and a large-capacity torque converter are used in the aforementioned starter. It is, however, particularly difficult to produce such a large-capacity torque converter in accordance with the increase of the capacity of electric power generation equipment without a remarkable increase in both the size and the cost of the torque converter.

Further, because the induction motor which has been used in the conventional starter generally requires a large starting current at the time of starting thereof, there is an increased risk of causing a large disturbance to the electric power system. Also in this respect, it is difficult to apply the conventional starter to the electric power generation equipment.

In addition, in the case where a plurality of gas turbines are used, it is necessary to provide a plurality of such conventional starters in one-to-one correspondence with the plurality of gas turbines. Also in this respect, increase in both the space requirement and the cost cannot be avoided.

Upon such circumstances, in recent years of attention has been focused on a starter called a "thyristor starting system".

The thyristor starting system is a starter in which a frequency converter supplied with an electric power from an electric power system is used, and variable-voltage variable-frequency electric power is supplied from the frequency converter to the aforementioned gas turbine generator to operate the generator as a motor, to thereby start the aforementioned gas turbine generator. Because thyristors are mainly used in the frequency converter, this starter system is called "a thyristor starting system".

According to the thyristor starting system, the frequency converter is necessary for starting the gas turbine generator, but it is unnecessary that the induction motor, the torque converter, etc. be used separately. It is further unnecessary to increase the size of the generator in order to perform starting because torque necessary for starting the generator never exceeds torque of the generator in the rated rotating conditions. Accordingly, because there is no risk of increase in both space requirement and the cost, the spotlight of attention has been focused on the thyristor starting system in recent years.

Apparatus of this type is disclosed in the following patent publications:

(1) U.S. Pat. No. 3,591,844

(2) JP-A-3-70825

(3) JP-A-4-29600

In the conventional technique of the aforementioned thyristor starting system, however, there is no consideration given to the fact that the starting of the generator is accompanied by an increase in the temperature of the rotor surface of the generator. Accordingly, the conventional technique has a problem in that there is a risk of damaging the generator.

That is, because a synchronous generator is mainly used as the gas turbine generator, the rotational speed of the generator depends on the frequency of the AC power supplied to the armature winding when the generator is operated as a motor.

In the conventional starter using the aforementioned thyristor starting system, therefore, variable-voltage variable-frequency electric power is obtained by using a frequency converter so that variable speed control necessary for starting the generator can be obtained. As is well known, such a frequency converter includes by an electric power rectification portion for converting AC power into DC power, and an electric power inversion portion for converting DC power into AC power.

At the time of starting of the gas turbine generator, the electric power inversion portion of the frequency converter supplies AC power to the armature of the generator. As is well known, the electric power inversion portion converts DC power into AC power by the switching operation of semiconductor devices. Accordingly, the current $i_L$ outputted from the electric power inversion portion of the frequency converter is a rectangular current as shown in the waveform (a) of FIG. 3, that is, an armature current $i_L$.

Accordingly, the armature current $i_L$ contains harmonic current components of frequency $f_i$ and amplitude $A_i$ follows:

$$f_i = (6i \pm 1)f_0$$

$$A_i = A_0/(6i \pm 1)$$

wherein i=1, 2, 3, . . .

$f_0$=frequency of the fundamental wave $A_0$=amplitude of the fundamental wave

As described above, a thyristor starting system, an armature current $i_L$ containing harmonic current components flows in the armature of the generator at the time of starting of the generator. As a result, an eddy current is induced in the surface of the rotor of the generator, so that heating occurs to cause the rotor temperature to increase.

Referring to FIG. 7, there is shown a synchronous generator rotor 13 used in a gas turbine generator or the like, for explaining the state of the eddy current induced upon starting. In the rotor 13, currents flowing in wedges 15, which are provided in the outer circumferential side of a winding so that the winding is not separated from slots by centrifugal force, go to teeth 14 between winding slots at junctions 15a of the wedges 15. Then, these eddy currents go to a retaining ring 18 and a damper ring 16 at an end of the rotor 13 and flow around the circumference of the rotor.

In a pole of the rotor, currents in the vicinity of cross slots 17, provided for maintaining a balance between the weight and the strength in the direction of the circumference of the rotor, are concentrated in respective ends of the cross slots 17.

Power is lost as a result of these eddy currents, so that the temperature of the surface of the rotor 13 rises.

On the other hand, in addition to this, sufficient cooling cannot be achieved in a low rotational speed condition at the time of starting of the generator because the cooling characteristic of the rotor depends on the rotational speed thereof. As a result, in the conventional technique, a risk of temperature increase in the generator occurs at the time of starting of the generator.

As a conventional technique for preventing such temperature increase in the generator, a gas turbine starting method is disclosed in JP-A-4-54227. According to this conventional technique, a variable-frequency electric source for operating the generator as a synchronous motor is provided so that electric power containing smaller harmonic components is supplied at the time of starting of the generator.

Although the above description has been made with reference to the starting-up condition that harmonic components are contained in an electric power system not only in the starting-up condition but also in the rated operating condition of the generator, so that the harmonic components cause a high temperature in the generator to thereby lower the quality of the commercial electric power.

SUMMARY OF THE INVENTION

An object of the present invention is to provide an apparatus for removing harmonic components of an electric power in electric power generation equipment so that it is possible to prevent the temperature of the generator from increasing due to the harmonic components.

Another object of the present invention is to provide an apparatus for removing harmonic components which exist in an electric power system, in which supply of high-quality electric power is attained by removing harmonic components of a commercial frequency generated by the electric power generation equipment.

According to the present invention, harmonic components of electric power supplied to a gas turbine generator at the time of starting of the generator are detected or harmonic components contained in an electric power system are detected so that an active filter is controlled on the basis of the detected harmonic components while operating the generator as a motor to thereby remove harmonic components of the supplied electric power or output electric power.

DESCRIPTION OF THE PREFERRED EMBODIMENTS

An apparatus for removing harmonic components of electric power frequency generated in electric generation equipment according to the present invention will be described below in detail on the basis of embodiments shown in the accompanying drawings.

Figure 1:
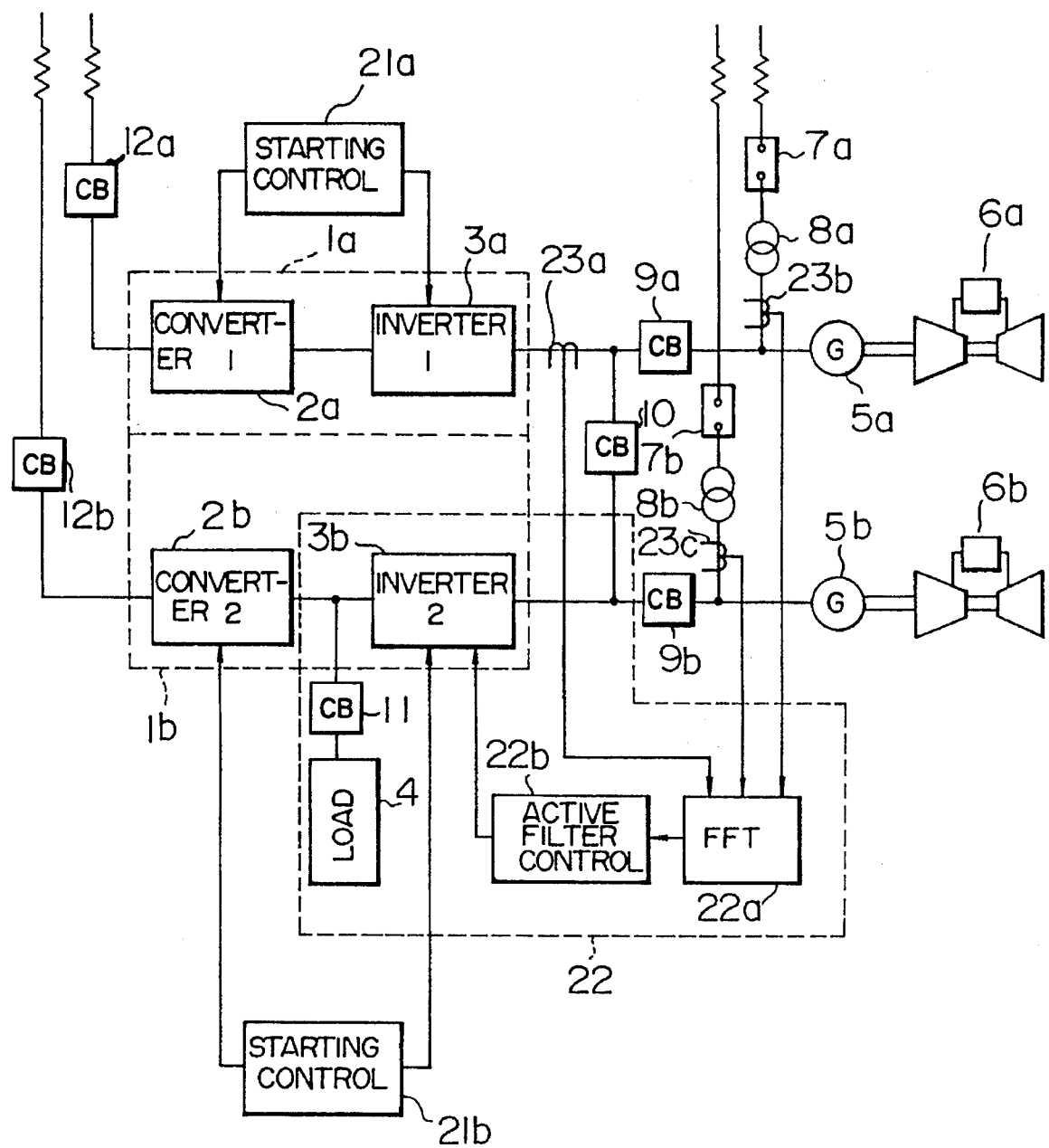
FIG. 1 is a block diagram showing an embodiment of a starter for electric power generation equipment according to the present invention.

FIG. 1 shows an embodiment of the present invention that is an example of the present invention being applied to electric generation equipment having two sets of gas turbine generators of systems a and b and two frequency converters. In FIG. 1, the reference numerals 1a and 1b designate frequency converters; 2a and 2b, electric power rectifiers; 3a and 3b, electric power inverters; 4, a load; 5a and 5b, generators; 6a and 6b, gas turbines; 7a and 7b, switchgears; 8a and 8b, main transformers; 9a, 9b, 10, 11, 12a and 12b, circuit-breakers; 21a and 21b, starting controllers; 22, an active filter section; 23a to 23c, detectors for detecting currents on electric power supply path; 22a, an FFT (fact Fourier transform) circuit for detecting harmonic components, except a fundamental harmonic component, in the currents detected by the detectors; and 22b, an active filter controller for generating a control signal on the basis of the harmonic components and for supplying the control signal to the electric power inverter 3b.

The frequency converters 1a and 1b have the electric power rectifiers 2a and 2b and the electric power inverters 3a and 3b, respectively. These electric power rectifiers and inverters 2a, 2b, 3a and 3b are controlled by the starting controllers 21a and 21b which are known conventionally. As a result, the frequency converters 1a and 1b receive AC power from an electric power system through the circuit-breakers 12a and 12b, convert the AC power into AC power with a variable frequency and a variable voltage, and supply the variable-frequency and variable-voltage AC power to the generators 5a and 5b through the circuit-breakers 9a and 9b, respectively.

At least one of the electric power inverters 3a and 3b, for example the electric power inverter 3b in FIG. 1, is constituted by a self arc-extinguishing semiconductor switching device such as a GTO (gate turn-off thyristor), or the like, which is used as a switching device. That is, the electric power inverter 3b is constituted by such a switching device to make not only turn-on control but turn-off control possible on the basis of a trigger signal and to make it possible to supply an arbitrary current from the active filter controller 22b to the electric power inverter 3b, so that function of the active filter section 22 is available to the electric power inverter 3b. In this case, the electric power inverter 3b is in an operative state in which the electric power inverter 3b serves as an electric power rectifier for converting AC power to DC power and for supplying the load 4 with a current to remove or cancel harmonic components of required electric power, that is, the electric power inverter 3b functions as an active filter. The active filter is a conventionally known technique as described in "Semiconductor Electric Power Converting Circuit", published Apr. 25, 1989 by The Institute of Electrical Engineers of Japan, pages 223–235, and in "Electrical Engineering Handbook" published Feb. 28, 1988 by The Institute of Electrical Engineers of Japan, pages 747–748.

The generators 5a and 5b are synchronous generators which are connected to the gas turbines 6a and 6b, respectively. The gas turbines 6a and 6b drive the generators 5a and 5b to rotate, so that the generators 5a and 5b carry out electric power generating operations and supply electric power with predetermined voltages and predetermined frequencies to an electric power system through the main transformers 8a and 8b and the switchgears 7a and 7b, respectively.

Next, the operation of this embodiment will be described.

Assume now the case in which the gas turbines 6a and 6b are and the electric power generation equipment of system a is to be started.

In this case, the generators 5a and 5b are stopped and the respective switchgears 7a and 7b are open (off).

In this case, first, the circuit-breakers 12a and 9a are closed, and the frequency converter 1a is controlled by the starting controller 21a so that AC power outputted from the electric power inverter 3a is supplied to the generator 5a.

As a result, the generator 5a serves as a synchronous motor which rotates in synchronism with the frequency of the AC power outputted from the electric power inverter 3a, so that torque is generated. Accordingly, the starting controller 21a controls the voltage and frequency of AC power supplied from the electric power inverter 3a to the generator 5a so that its voltage and frequency are increased from zero at a predetermined rate determined by the rotation inertia force of the generator 5a and the rotation inertia force of the gas turbine 6a.

Figure 4:
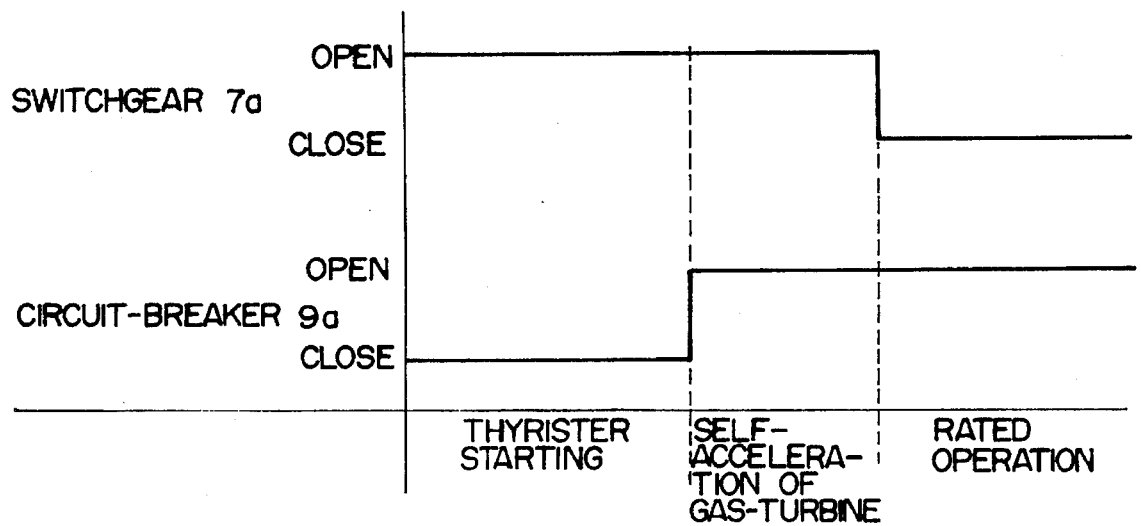
FIG. 4 is a timing chart for explaining the operation of embodiments of the present invention.

As a result, the generator 5a generates large torque, close to the rated value as a synchronous motor. Accordingly, after rotating of the generator 5a is started together with the rotating of the gas turbine 6a, the rotational speed increases at a predetermined rate. Accordingly, if the operating condition is switched over to the gas turbine 6a side by opening (turning-off) the circuit-breakers 12a and 9a when the rotational speed reaches a predetermined value sufficient to allow the gas turbine 6a to be accelerated by its own ability, the starting of the electric power generation equipment of the system, constituted by the gas turbine 6a and the generator 5a, can be terminated. Thereafter, if the generator 5a is connected to the electric power system by closing the switchgear 7a in predetermined timing after the rotational speed of the generator 5a and the gas turbine 6a reaches its rated value, the operating condition can be switched to the ordinary operating side. FIG. 4 shows the timing of operating of the circuit-breaker 9a and the switchgear 7a in this case.

Like the conventional technique, the aforementioned technique has a risk of heat generation because an AC current containing harmonic current components is supplied from the frequency converter 1a to the generator 5a. In the embodiment of FIG. 1, therefore, the circuit-breaker 10 is closed during this time so that the active filter section 22 is connected, along with the output of the electric power inverter 3a, to the armature of the generator 5a, and the circuit-breaker 11 is further closed so that the load 4 is connected to the electric power inverter 3b to thereby use the electric power inverter 3b as an electric power rectifier. In this occasion, the circuit-beakers 12b and 9b are opened continuously.

In this situation, the active filter controller 22b of the active filter section 22 detects, through the current detector 23a, the current supplied from the electric power inverter 3a to the armature of the generator 5a, and the active filter controller 22b controls the electric power inverter 3b so that a compensating current necessary for canceling harmonic current components contained in the thus detected current is outputted from the electric power inverter 3b.

Next, the theory of generation of the compensating current in the active filter section 22 will be described.

As described above, a self arc-distinguishing semiconductor switching device such as a GTO (gate turn-off thyristor) is used as a switching device in the electric power inverter 3b which is a constituent member of the active filter section 22. Accordingly, the electric power inverter 3b can be controlled by the active filter controller 22b so that the electric power inverter 3b carries out the operation of converting AC power to DC power to supply a current to the load 4 with controlled timing.

If the switching device of the electric power inverter 3b is turned on and off in accordance with the harmonic current components detected by the current detector 23a, a compensating current of components opposite to the harmonic current components can be generated from the electric power inverter 3b. The compensating current is superimposed on the current outputted from the electric power inverter 3a of the frequency converter 1a so that the resulting current is supplied to the generator 5a with the harmonic current components contained in the current outputted from the electric power inverter 3a canceled. As a result, the risk of a high temperature due to eddy current in the armature of the generator 5a at the time of starting-up can be suppressed sufficiently.

Figure 2:
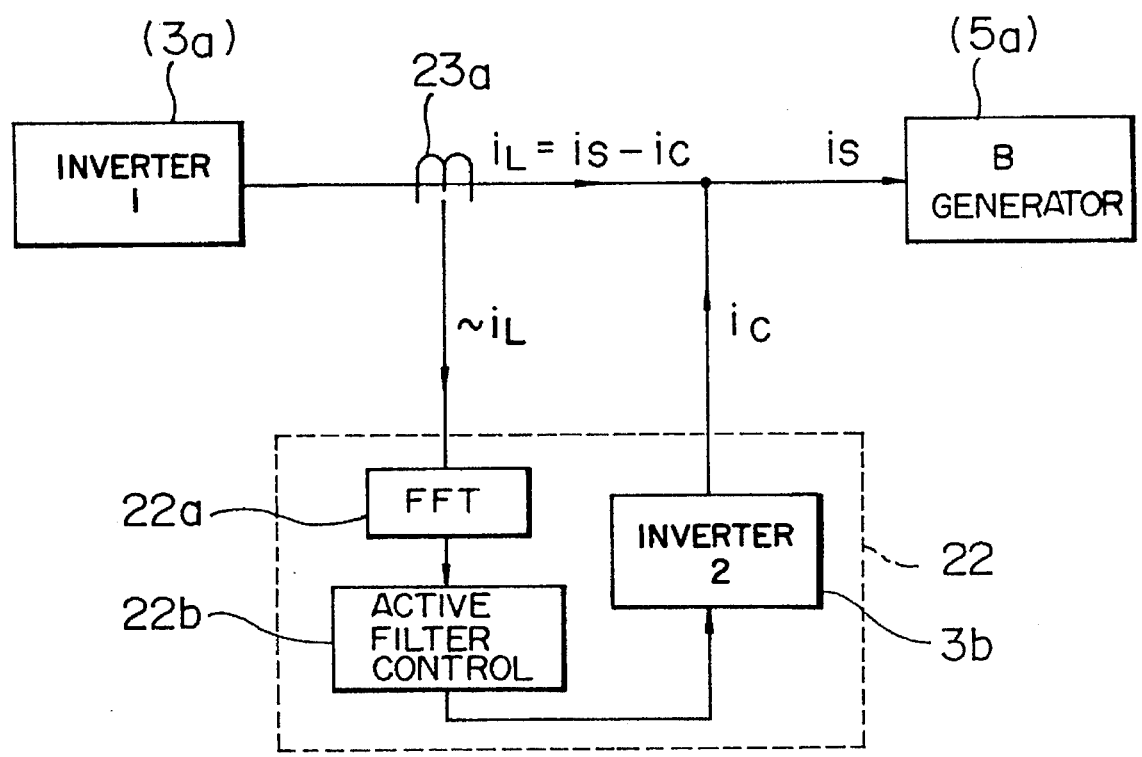
FIG. 2 is a block diagram for explaining the operation of an active filter in embodiments of the present invention.
Figure 3:
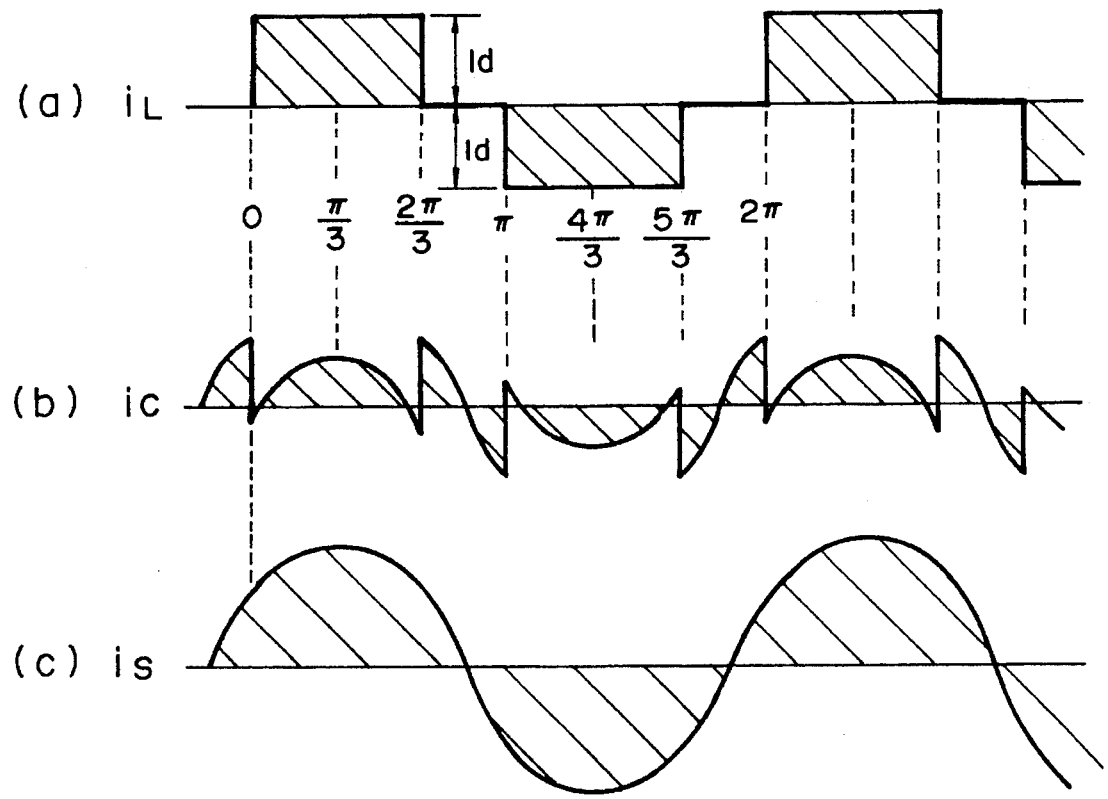
FIG. 3 is a view of waveforms for explaining the operation of embodiments of the present invention.

Referring to FIGS. 2 and 3, the operation of canceling harmonic current components with the compensating current in this case will be described in detail. When the current $I_L$ in outputted from inverter 1 in FIG. 2 is a rectangular current as shown in the waveform (a) of FIG. 3, on the assumption that generator B in FIG. 2 represents generator 5a, the current $I_L$ shown in the waveform (a) of FIG. 3 is equivalent to a current obtained by subtracting current $i_C$ shown in the waveform (b) of FIG. 3 from sinusoidal current $I_S$ shown in the waveform (c) of FIG. 3.

Accordingly, if the electric power rectifier 3b of the active filter section 22 is controlled by the active filter controller 22b so that the current $i_C$ shown in the waveform (b) of FIG. 3 is outputted from the electric power rectifier 3b, the sinusoidal current $i_S$ shown in the waveform (c) of FIG. 3 is supplied to the generator 5a. Accordingly, in this embodiment, there is no eddy current generated in the rotor even at the time of starting-up, so that heat generation can be suppressed.

Next, in the case where the electric power generation equipment of the system b is to be started, the circuit-breaker 9b is closed, while the circuit-breaker 9a is opened continuously.

As a result, the generator 5b is connected to the outputs of the frequency converters 1a and 1b. Accordingly, variable-voltage and variable-frequency AC power is supplied from the frequency converter 1a to the generator 5b to thereby start the generator 5b, and a compensating current is supplied from the active filter section 22 in the same manner as in the case of starting-up of the system a.

Figure 5:
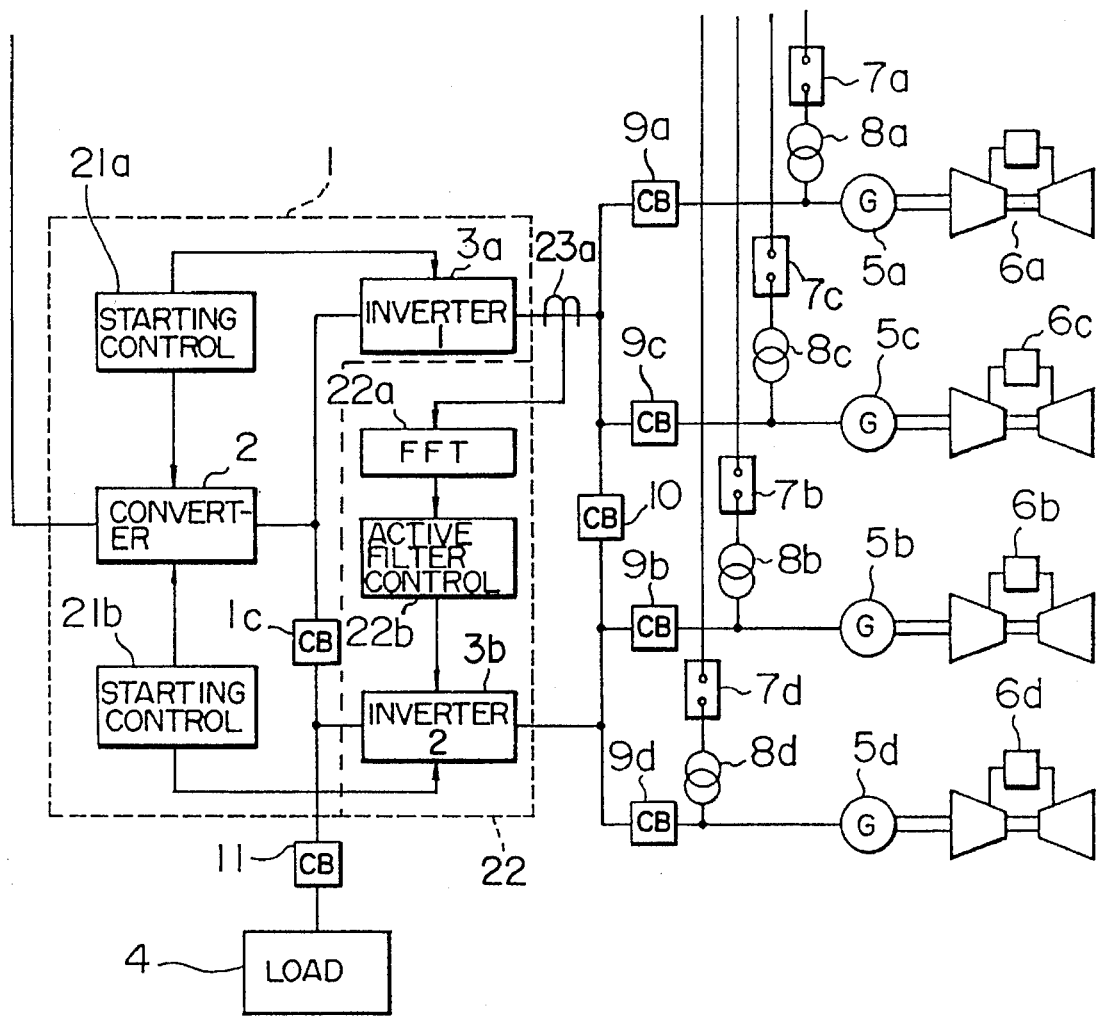
FIG. 5 is a block diagram showing another embodiment of the present invention.
Figure 6:
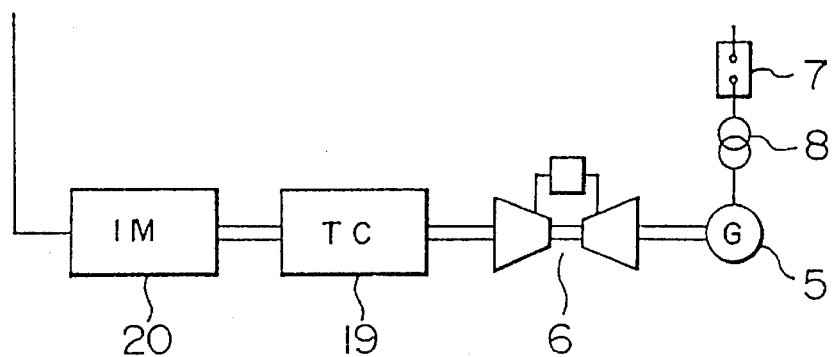
FIG. 6 is a block diagram for explaining a conventional starter using a thyristor starting system.
Figure 7:
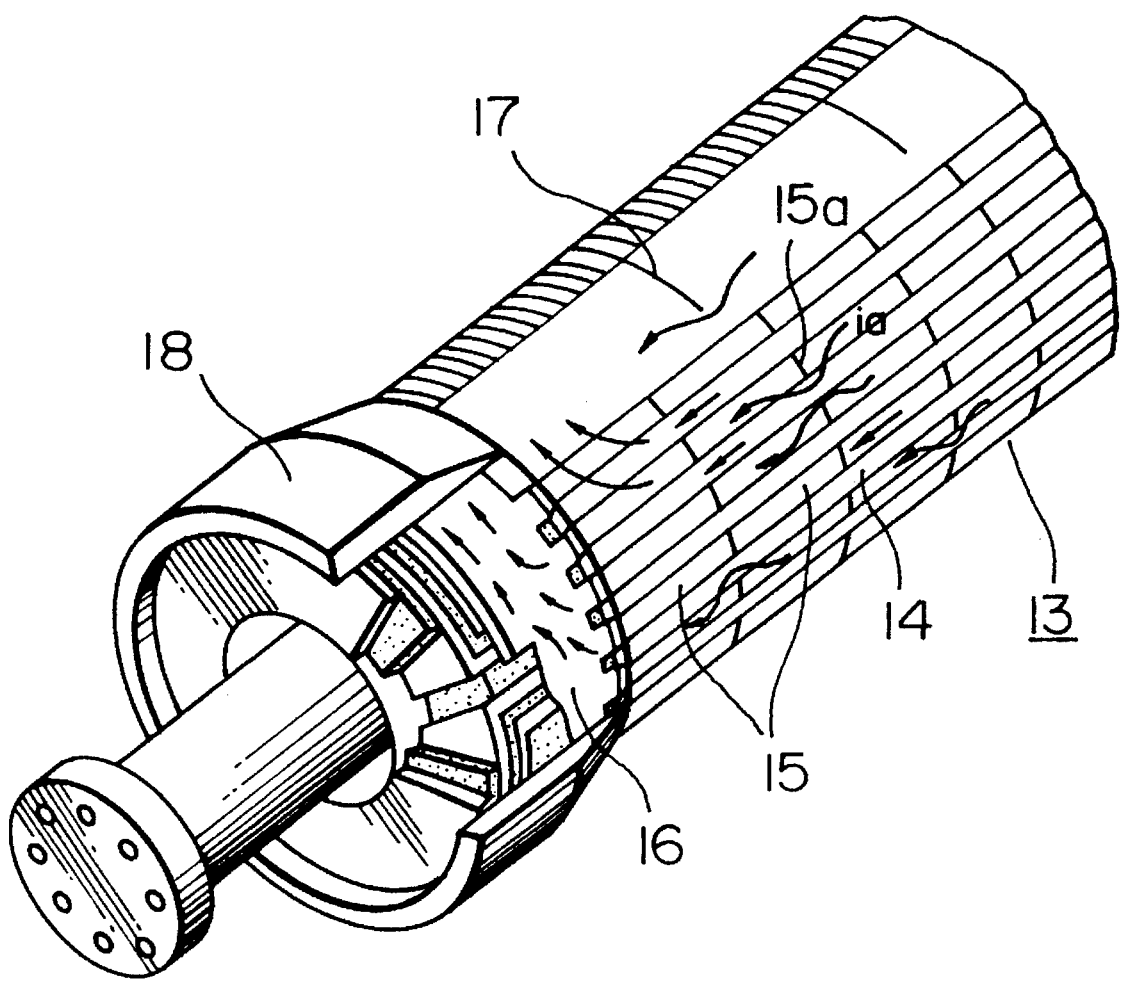
FIG. 7 is a view for explaining an eddy current state in a rotor of an electric power generator.

FIG. 5 shows another embodiment of the present invention in which the present invention is applied to gas turbine electric power generation equipment of four systems a to d. In a control system constituted by a frequency converter 1, a load 4, a circuit-breaker 11, starting controllers 21a and 21b, an active filter section 22, an FFT 22a, an active filter controller 22b, a current detector 23a, etc. shown in FIG. 5, the same reference numerals common to FIG. 1 designate the same or equivalent parts.

In the case of equipment of a thyristor starting system, the frequency converter is used only at the time of starting-up. From this respect, it is sufficient in the present invention that two frequency converters at a minimum are provided at the time of starting-up. In this case, it is further unnecessary that the electric power inverter be provided as a frequency converter constituting the active filter section. Accordingly, in the embodiment of FIG. 5, only one electric power rectifier 2 is provided for the generators 5a to 5d and gas turbines 6a to 6d of the four systems a to d so that the electric power rectifier 2 is used in common for two electric power inverters 3a and 3b. A circuit-breaker 1c is therefore provided so that the electric power inverter 3b can be disconnected.

In this embodiment, the electric power inverter 3b is also provided so that it can be connected to the electric power rectifier 2. This is because starting-up can be performed by the electric power inverter 3b when a failure occurs in the electric power inverter 3a side. For the same reason, the frequency rectifier 2b is also provided in the frequency converter 1b in the embodiment of FIG. 1. In the embodiment of FIG. 1, however, the active filter function cannot be carried out.

In the aforementioned embodiment, harmonic components contained in the output of the frequency converter 1a are compensated by the active filter section 22 to thereby improve the waveforms of currents supplied to the generators 5a and 5b and suppress heat generation in the generators 5a and 5b at the time of starting-up. Not only at the time of starting-up but in the rated operating condition, harmonic components of a commercial frequency existing in an electric power system can be removed by operating the active filter section 22.

In the embodiment of FIG. 1, even in the case where the generator 5a or 5b is in the rated operating state, harmonic components in the electric power system can be compensated because harmonic components in the electric power system can be controlled so as to be canceled when the circuit-breakers 12a and 12b are opened and at the same time the circuit-breakers 9a and 10 (or 9b and 10) are closed to connect the active filter section 22 to either the system a or the system b, make the FFT 22a extract harmonic components from the current detected by the detector 23b or 23c and control the electric power inverter 3b through the active filter controller 22b.

Further, in the aforementioned embodiment, because the active filter section 22 is connected between the generator 5a or 5b subjected to the starting-up operation and the frequency converter 1a, compensation of harmonic components can be performed more effectively than in the case where the active filter section 22 is connected at another place. Further, in this embodiment, because the active filter section 22 is connected between the transformer 8a or 8b and the generator 5a or 5b, the withstanding voltage required for the active filter section 22 can be reduced to a small value, so that there arises an effect that increase in cost can be suppressed.

According to the present invention, increase of the temperature of a generator in gas turbine electric power generation equipment of a thyristor starting system using a frequency converter can be suppressed securely. Accordingly, starting-up can be performed easily while the merits of the thyristor starting system are utilized efficiently with no bad influence of a temperature increase on the generator.

Further, according to the present invention, reactive power in the electric power system can be controlled so that stabilization of the electric power system can be attained.

I claim:

1. An apparatus for removing harmonic components of electric power frequency generated in electric power equipment, said apparatus comprising:

a first electric generator;

a second electric generator;

a first frequency converter connected to said first and second generators;

a second frequency converter connected to said first and second generators;

means for supplying electricity from an electric power system to said first and second frequency converters, to supply variable-voltage, variable-frequency electric power to a selected one of said first and second generators to make said selected one of said generators operate as a motor, to thereby start said selected one of said generators;

a first transformer connected to said first generator;

a second transformer connected to said second generator;

switching means for alternatively connecting a selected one of said first transformer and said second transformer to the electric power system, to supply electric power from the selected one of said first and second generators to the electric power system;

a detector for detecting harmonic components of an electric power frequency contained in the electric power supplied from said first frequency converter to the selected one of said first and second generators; and an active filter for removing the harmonic components of the electric power frequency contained in the electric power supplied from said first frequency converter, said active filter including said second frequency converter.

2. An apparatus according to claim 1, wherein said first and second generators are gas turbine generators, and starting of said one of said generators starts the gas turbine of said one of said generators.

3. An apparatus according to claim 1, wherein each of said frequency converters includes:

an electric power rectifier for converting commercial AC power supplied from the electric power system into DC power; and an electric power inverter for converting DC power supplied from said electric power rectifier into variable-voltage variable-frequency AC power.

4. An apparatus according to claim 1, wherein said detector includes:

means for detecting a current which flows on a line connecting said first frequency converter and said one of said first and second generators; and an FFT for extracting harmonic components of required electric power flowing on said line from the current detected by said detecting means.

5. An apparatus according to claim 1, wherein said active filter includes:

an active filter controller for generating a control signal on the basis of the harmonic components detected by said detector;

means for applying the control signal to said second frequency converter to remove the harmonic components of the electric power frequency.

6. An apparatus according to claim 5, wherein said electric power rectifier includes a self arc-extinguishing semiconductor switching device.

7. An apparatus for removing harmonic components of electric power generated in electric power equipment, said apparatus comprising:

a first electric generator;

a second electric generator;

a first frequency converter connected to an electric power system to provide variable-voltage, variable-frequency electric power;

first switching means for connecting said first frequency converter to a selected one of said first and second generators to make said selected one of said generators operate as a motor, to thereby start said selected one of said generators;

a first transformer connected to said first generator;

a second transformer connected to said second generator;

second switching means for connecting a selected one of said first transformer and said second transformer to the electric power system, to supply electric power as generated by the selected one of said first and second generators to the electric power system;

a detector for detecting harmonic components contained in the electric power supplied from said first frequency converter to the selected one of said first and second generators; and an active filter for removing the detected harmonic components, said active filter including a second frequency converter connected to said first and second generators and means for supplying electricity from the electric power system to said second frequency converter.

* * * * *